UNITED STATES PATENT OFFICE.

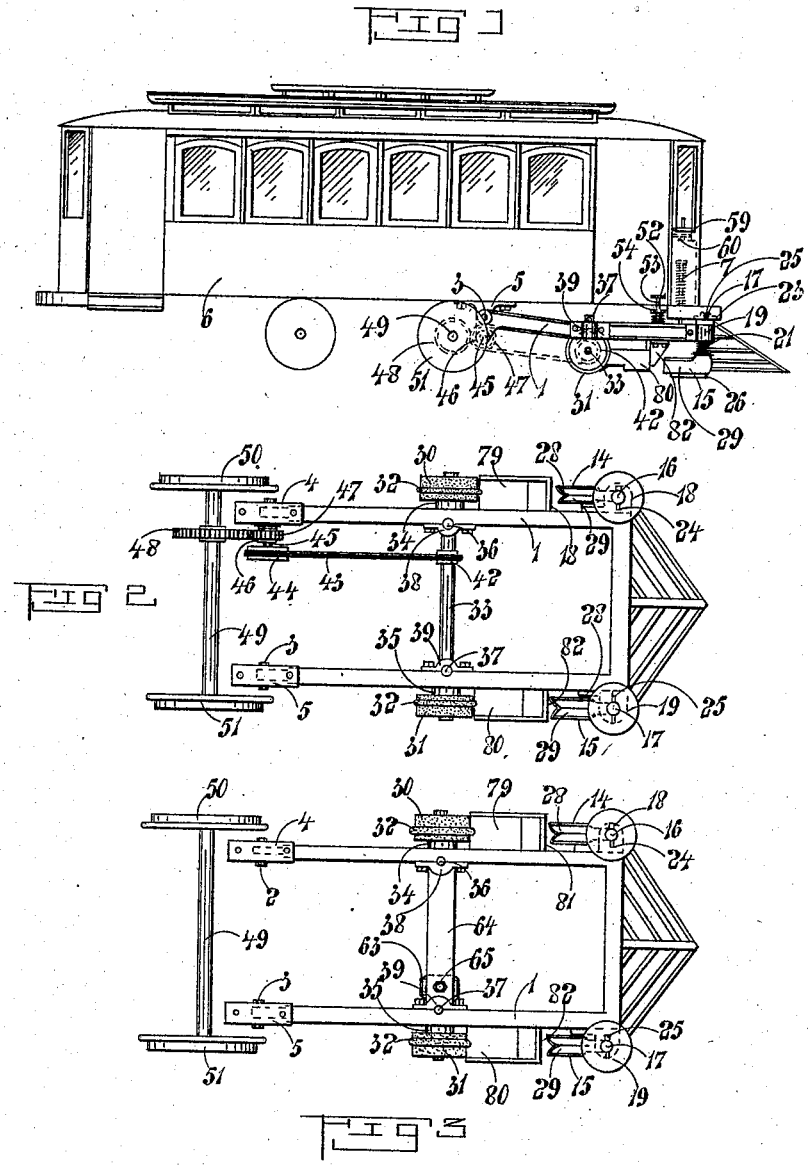

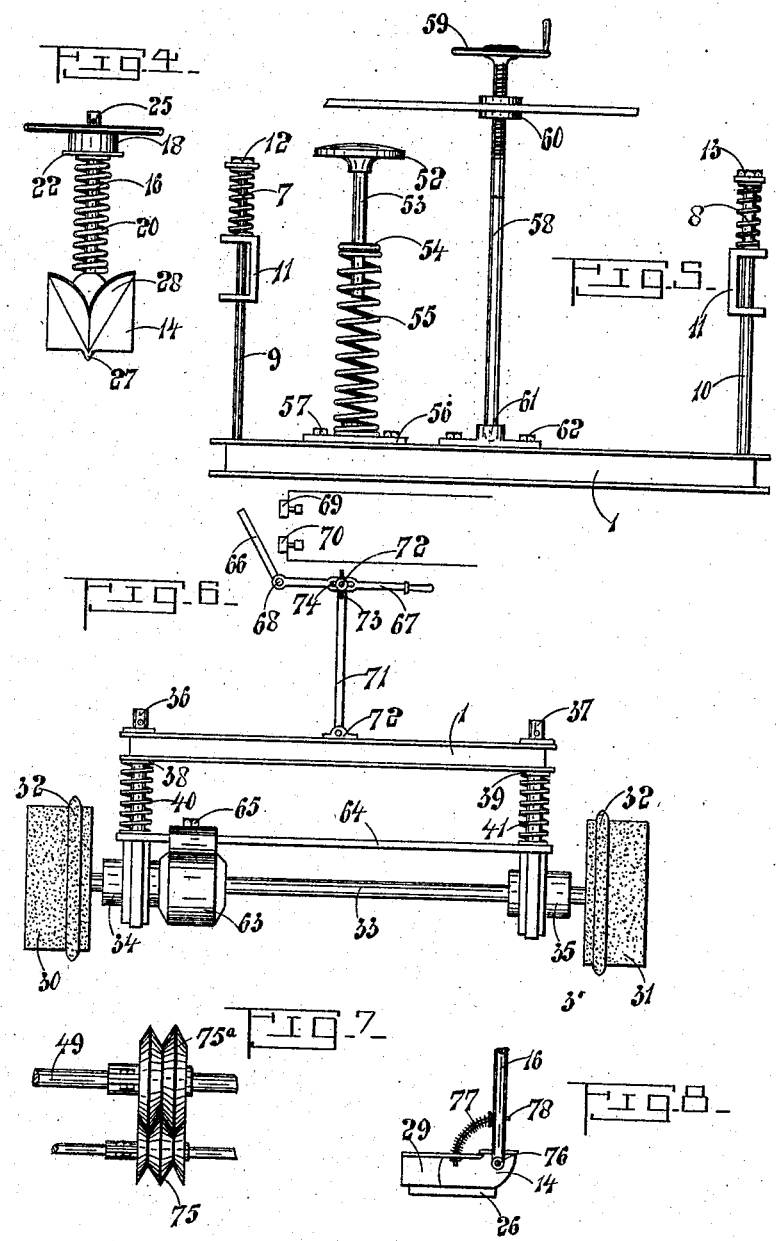

HILARY QUERTIER, OF DUNEDIN, NEW ZEALAND.

APPARATUS FOR CLEANING THE RAILS OF TRAMWAYS AND THE LIKE.

No. 815,213. Specification of Letters Patent. Patented March 13, 1906.

Application filed October 9, 1905. Serial No. 282,060.

*To all whom it may concern:*

Be it known that I, HILARY QUERTIER, a subject of His Majesty the King of Great Britain and Ireland, residing at Woods Hotel, Dunedin, in the Provincial District of Otago, in the Colony of New Zealand, have invented certain new and useful Improvements in Apparatus for Clearing the Rails of Tramways and the Like, of which the following is a specification.

The invention provides improved apparatus for employment upon a vehicle running upon grooved rails for the purpose of scraping and brushing the grooves and tops of said rails.

The apparatus is brought into operation at the will of an attendant upon the vehicle and is also automatically started when an obstacle is struck and automatically goes out of operation when the pressure of the obstacle is removed.

According hereto I employ a frame which is approximately rectangular in plan and having one of its ends pivotally mounted in brackets secured beneath the vehicle. The frame extends forwardly and is supported by tension-springs. Plows or scrapers, one for each of the rails, are arranged one upon each side of the front of the frame. Each plow is fixed upon an upwardly-extending spindle which passes through a socket in the frame and is normally projected downward by a spring threaded upon said spindle. The plow trails behind the axis of said spindle, which being free to swivel permits the plow to adapt itself to curves of the rail. The plow has a point adapted to clear the rail-groove and has rearwardly-diverging wings which throw the cleared material to each side. Said frame also carries a pair of bristle or wire brushes, one for each rail, said brushes each having a projecting portion adapted to fit into the rail-groove. The axle which carries said brushes is revolubly mounted in bearings at the lower ends of vertical spindles, which are capable of vertical movement in the frame. A spring threaded upon each of said spindles normally presses the axle downward. When the apparatus is employed in connection with an electrical railway system, an electric motor is carried upon the brush-axle for the purpose of revolving the same, current being conveyed to said motor through a switch under control of the attendant on the vehicle. The brush-axle has a sprocket-pinion which is connected by a chain with a sprocket-wheel mounted upon a spindle carried in brackets projecting downwardly from the end of the frame of the apparatus and having a tooth-pinion adapted to gear with a tooth-wheel fixed upon the axle, which carries a pair of traveling wheels of the vehicle. The position of the pivotal support of the frame is so placed that when the frame is lifted by the supporting-springs referred to the said tooth-pinion is brought out of gear with the tooth-wheel referred to and the brushes are clear of the ground and do not revolve. If the front of the apparatus encounters an obstacle, the frame is turned upon its pivot, the tooth wheel and pinion are brought into gear, and the brushes revolved. The frame may also be depressed by a treadle under control of the attendant of the vehicle and adapted when pressure is exerted upon it to compress a spring upon the top of the frame. For the same purpose I may employ a hand-wheel to turn a screw, and thereby compress a spring which presses upon the end of the frame.

Referring to the accompanying drawings, Figure 1 is a side elevation of a tram-car fitted with the invention; Fig. 2, a plan of the cleaner; Fig. 3, a plan of the cleaner; Fig. 4, an end elevation of a plow and its connections; Fig. 5, an end elevation of the frame of a cleaner and its operating mechanism, and Fig. 6, an end elevation of the cleaner; Fig. 7, a plan of a friction wheel and pinion, and Fig. 8, a side elevation of a plow.

Referring to the drawings, the frame 1 is approximately rectangular in plan, as shown in Figs. 2 and 3, and is pivoted at its rear end by pins 2 and 3 to brackets 4 and 5, secured beneath the vehicle 6. The frame extends forwardly and is supported from the vehicle upon springs 7 and 8, (see Fig. 5,) which are threaded upon bolts 9 and 10, attached to the said frame and rest upon the top of the frame 11 of the vehicle 6, the springs being retained on the bolts by nuts 12 and 13. Plows or scrapers 14 and 15 are arranged one upon each side of the front of the frame and immediately above the rails. The plows are fixed upon upwardly-extending spindles 16 and 17, which pass through sockets 18 and 19 in the frame and are normally forced downward by springs 20 or 21, threaded on the spindles 16 and 17. Washers 22 and 23 and pins 24 and 25 are provided upon the upper ends of the spindles to retain the spindles in their sockets after the springs have forced them into their lowest position. The plows have points 26 and 27 adapted to scrape dirt out of the rail-grooves and have rearwardly-diverging wings 28 and 29, which throw the cleared material to each side. The frame also carries a pair of bristle or wire brushes 30 and 31, one for each rail, said brushes each having a projecting portion 32, adapted to fit into the said groove. The axle 33, which carries said brushes, is revolubly mounted in bearings 34 and 35 at the lower ends of vertical spindles 36 and 37, which are capable of vertical movement in sockets 38 and 39, fixed to the frame 1. Springs 40 and 41 upon said spindles (see Fig. 6) normally press the axle downward. The axle 33 has a sprocket-pinion 42, which is connected by a chain 43, a sprocket-wheel 44, mounted upon a spindle 45, carried in a bracket 46, projecting downwardly from the frame 1, and having a tooth-pinion 47, adapted to gear with a tooth-wheel 48, fixed upon the axle 49, which carries a pair of traveling wheels 50 and 51 of the vehicle 6. The position of the pivot-pins 2 and 3 is such that when the frame is lifted by the springs 7 and 8 the tooth-pinion 47 is withdrawn from gearing with the tooth-wheel 48 and the brushes 30 and 31 are raised from the ground and do not revolve. If the front of the apparatus encounters an obstacle, the frame 1 is turned upon its pivot-pins 2 and 3, the tooth-wheel 48 and pinion 47 are brought into gear, and the brushes 30 and 31 revolved. The frame 1 may also be depressed by a treadle 52 (see Figs. 1 and 5) under the control of the attendant of the vehicle, the spindle 53 of the said treadle passing through a guide-bracket 54, fixed to the vehicle, and having its lower part inserted into a coil-spring 55, the bottom of which rests upon a bracket 56, secured to the frame 1 by bolts 57. When pressure is exerted upon the treadle 52, the frame 1 is depressed. For the same purpose I may employ a screw 58 and hand-wheel 59, the screw passing through a nut 60, fixed to any convenient part of the vehicle, and having its end resting in a cup-shaped bracket 61, attached to the frame 1 by bolts 62.

When the apparatus is employed in connection with an electrical railway system, the before-mentioned gear for driving the brushes is dispensed with, and an electric motor 63 (see Figs. 3 and 6) is carried on a bar 64, fixed by bolts 65 to the bearings 34 and 35 of the brush-axle 33, to which it is fitted for the purpose of revolving the same, current being conveyed to said motor through a switch-bar 66, integral with the lever 67 and pivoted upon a pin 68 (shown diagrammatically in Fig. 6) under control of the attendant. When the lever is depressed, the bar 66 slides upon the terminals 69 and 70 and closes the circuit. When the frame 1 is depressed by coming into contact with an obstacle, the switch-bar 66 is operated to start the motor by a rod 71, attached at one end to a bracket 72, fixed to the frame 1, and at the other end to the lever 67 by a bolt 72 and wing-nut 73. The lever has a slot 74, whereby the stroke of the bar 66 may be adjusted.

The brushes and plows may be used simultaneously, or the plows may be dismounted and the brushes used alone.

In Fig. 7 is shown friction-gear comprising a friction-pinion 75 and a friction-wheel $75^a$, which may be used instead of the tooth-pinion 47 and tooth-wheel 48.

In Fig. 8 the plow 9 is shown pivoted to the spindle 16 by a pin 76, and a spring 77, threaded upon a bolt 78, bent into a curve with the pin 76 as its center, normally tends to keep the plow in a horizontal position. Upon meeting an obstruction the spring yields and allows the plow to turn upon its pivot.

The brushes revolve in a direction to throw the dirt forwardly of the vehicle, and direct boxes 79 and 80, carried by brackets 81 and 82, secured to the frame 1, catch the dirt as it is thrown forwardly.

What I claim, and desire to secure by Letters Patent of the United States, is—

1. Apparatus for the purpose indicated, composing in combination, a frame pivoted at one end beneath a vehicle, bolts attached to the frame, springs threaded upon the bolts between the nuts and the frame of the vehicle and supporting the front end of the frame, means for depressing the frame, brackets secured to the front of the frame, swiveling stems fitting the brackets, plows fixed to the stems and having points entering the rail-grooves, bearings fitted to the frame, an axle journaled in the bearings, brushes fixed upon the ends of the axle, and means for revolving the axle, substantially as set forth.

2. Apparatus for the purpose indicated, in combination, a frame pivoted at one end beneath a vehicle, bolts attached to the frame, springs threaded upon the bolts between the nuts thereof and the frame of the vehicle and supporting the front end of the frame, a treadle having a stem, a spring threaded upon the lower part of the stem, a bracket secured to the frame and adapted to receive the end of the treadle-spring, a screw, a nut receiving the screw and fixed to the vehicle, a cup-shaped bracket fixed to the frame and adapted to receive the end of the screw, swiveling plows attached to the front of the frame, bearings fitted to the frame, an axle journaled in the bearings, brushes fixed upon the ends of the axle, and means for revolving the axle, substantially as set forth.

3. Apparatus for the purpose indicated comprising in combination, a frame pivoted at one end beneath a vehicle, bolts attached to the frame, springs threaded upon the bolts between the nuts thereof and the frame of the vehicle, and supporting the front end of the frame, means for depressing the frame, brackets secured to the front of the frame, swiveling stems fitting the brackets, plows fixed to the stems and having points entering the rail-grooves, bearings fitted to the frame, an axle journaled in the bearings, brushes fixed upon the ends of the axle, a sprocket-pinion secured upon the axle, a bracket fixed to the frame, a spindle journaled in the bracket, a sprocket-wheel fixed upon the spindle, a sprocket-chain connecting the sprocket-pinion and sprocket-wheel, a tooth-pinion secured upon the spindle, and a tooth-wheel secured upon the carrying-axle of the vehicle and gearing with the tooth-pinion when the frame is depressed, substantially as set forth.

4. Apparatus for the purpose indicated comprising in combination, a frame pivoted at one end beneath a vehicle, bolts attached to the frame, springs threaded upon the bolts between the nuts thereof and the frame of the vehicle and supporting the front end of the frame, means for depressing the frame, brackets secured to the front of the frame, swiveling-stems fitting the brackets, plows fixed to the stems and having points entering the rail, grooves, bearings fitted to the frame, an axle journaled in the bearings, brushes fixed upon the end of the axle, a bar fixed to the bearings of the axle, a motor fixed to the bar and mounted upon the axle, a switch attached to the vehicle, a lever-arm upon the switch and a rod connecting the frame and the lever-arm substantially as set forth.

In testimony whereof I have signed my name to this specification, this 1st day of September, 1905, in the presence of two witnesses.

HILARY QUERTIER.

Witnesses:
 H. W. LACKISACK,
 S. P. MERAIM.